United States Patent [19]

LeVert

[11] Patent Number: 5,256,878
[45] Date of Patent: Oct. 26, 1993

[54] SELF POWERED DETECTOR BASED MONITOR FOR RADIOGRAPHIC CAMERAS

[75] Inventor: Francis E. LeVert, Knoxville, Tenn.

[73] Assignee: K.E.M.P. Corporation, Knoxville, Tenn.

[21] Appl. No.: 825,119

[22] Filed: Jan. 24, 1992

[51] Int. Cl.⁵ .............................. G01T 1/24
[52] U.S. Cl. ............... 250/370.04; 250/497.1
[58] Field of Search ............ 250/370.04, 497.1

[56] References Cited

U.S. PATENT DOCUMENTS

| | | | |
|---|---|---|---|
| 3,127,515 | 3/1964 | Bernas | 250/497.1 |
| 4,091,288 | 5/1978 | LeVert et al. | 250/370.04 |
| 4,118,626 | 10/1978 | Goldstein et al. | 250/370.04 |
| 4,238,676 | 12/1980 | Goldstein et al. | 250/370.04 |
| 4,259,575 | 3/1981 | LeVert et al. | 250/370.04 |

Primary Examiner—Carolyn E. Fields

[57] ABSTRACT

An improved large area self-powered photon detector (hereafter referred to by the acronym LASPPD) based monitor of the movement of photon sources into and out of radiographic source shields is described. The term photon shall be used throughout this application to denote x-rays or gamma rays. The photon source position monitor system comprises: a photon sensitive electrode assembly; a current-to-voltage converter-amplifier that is electrically connected to the electrode assembly; an analog logic circuit coupled to output of the current-to-voltage converter-amplifier; an integrated circuit for controlling the on/off state of an annunciator; an alarm annunciator; a direct current power source and a metallic enclosure that encompasses the electrode, the signal conditioning electronics, analog logic circuit, direct current power source, integrated circuit, and alarm annunciator. When the photon source is driven out of its shield past the LASPPD based monitor positioned proximate the source egress/ingress conduit of the shield, the photons emitted by the source interact with the electrode of the monitor. The photons interacting with the electrode generate a current that is amplified and conditioned such that it can be used to activate an annunciator that remains in an active condition until the source is retracted back into the shield past the monitor. The device provides a radiographic technologist with an active alarm that indicates the position of a radioactive source during radiographic inspections of industrial components.

6 Claims, 4 Drawing Sheets

SELF POWERED DETECTOR BASED MONITOR FOR RADIOGRAPHIC CAMERAS

TECHNICAL FIELD

This invention relates to a method of sensing and indicating the movement of photon sources into and out of their biological shields during nonconductive radiographic inspection of components. Hereafter, the biological shield and the associated source drive mechanism of a nondestructive radiographic inspection system shall be referred to as a radiographic camera.

BACKGROUND

The use of radioactive sources for nondestructive testing of vital components of industrial systems poses radiation hazards for radiographic technicians and personnel in the area where the testing is being done. To avoid unacceptable exposure to radiation by radiographic technicians, personal dosimeters, ion chamber or Geiger Mueller tube based survey meters are used to indicate the gamma dose rates at the position of the technician. In addition to providing an analog display of the dose rate when inserted into the field, the survey meters, which can employ ion chamber or Geiger Mueller tubes as gamma ray sensing elements, can be equipped with audible alarms. There are also personal dosimeters that are worn by technicians that provide direct and indirect means of monitoring instantaneous and integrated radiation dose exposures. Some of these devices, which are attached to the clothing of technicians, can provide an audible alarm whenever the gamma field at the technicians' location exceeds a prescribed dose rate.

Radiographic camera systems consist of storage containers that contain depleted uranium shielding materials wherein the source resides during nonuse. Positive mechanical control of the source as it is moved in and out of the shield and through the source guide tube is achieved via a mechanical linkage between the source and a hand cranked mechanism. These systems do not contain any active method based on the detection of radiation to verify whether or not the source was parked in the shield after use. That is, even though the driving cable is retracted there is no existing method od determining whether or not the source was returned to the shield by the mechanically driven control units other than the active survey of the area with a survey meter. To determine whether or not the source was mechanically withdrawn, the technician must approach the radiographic camera-source guide tube area with the survey meter. If the source was not returned to the shield, the technician risks exposing him or herself while attempting to determine if a hazard exists. These sources, which typically have activities as large as 100 Curies can pose serious health risk to users. Because of the risk, all industrial radiographers and assistants must wear integrating radiation dose measuring devices and alarming dose ratemeters.

Given the potential for serious radiation exposure to a practicing radiographic technologist and to pedestrian traffic at the facility where the irradiation is being performed, it was desired to provide an invention that would automatically provide a visible or audible alarm when a source is driven out of its shield. A warning indicator that would remain activated until the source is retracted back into the shield.

A second objective of the present invention is to provide a source position monitor with a rugged large area self-powered detector that would be sensitive to photons with different energies. A source monitor that provides a signal to activate a local source/out indicator at the radiographic camera and a remote source out indicator. Such a remote indicator may be located at a fixed highly visible position or worn by the radiographic technologist.

A further objective of this invention was to provide a source position monitor that would not require an external power source to power the photon detector in the monitor.

These and other objectives and advantages of the present invention will become readily apparent from the following accompanying drawings.

BRIEF DESCRIPTION OF THE DRAWINGS

The following drawings illustrate a preferred embodiment of the invention and, when taken together with the accompanying description, explain the principle of operation and elements of the invention.

DISCLOSURE OF THE INVENTION

Figure 1:
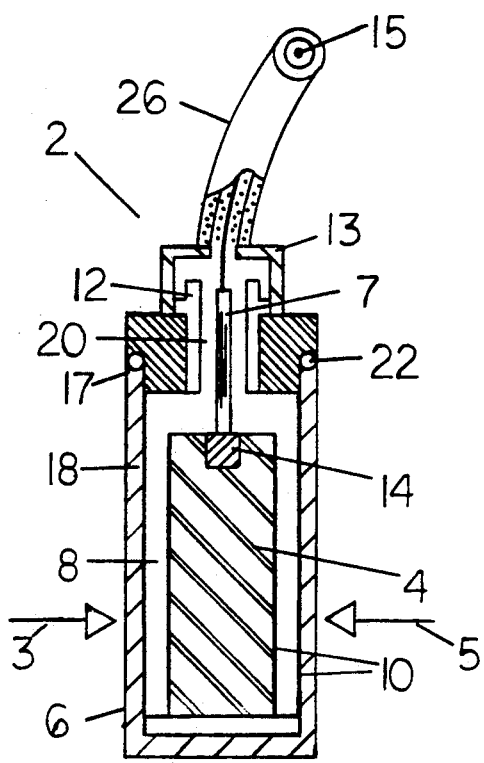
FIG. 1 shows a schematic drawing of a large area self-powered photon detector (LASPPD) with a solid dielectric that is used in the source position monitor.

In accordance with the present invention, there is provided a radioisotopic source position monitor that utilizes the photon interaction with the material of a LASPPD and the resulting charge associated with the flow of photon liberated electrons to achieve an improved method of indicating whether the photon source in an industrial radiographic unit is exposed or secured within its biological shield.

The source position monitor comprised of: a photon detector assembly that consists of a central metallic component (central electrode) surrounded by dielectric material and a metallic outer shell (outer electrode); a connector that electrically connects the central metallic electrode and the outer metallic shell such that the charge generated on the central metallic component is conveyed out of the electrode to a current-to-voltage preamplifier; a logic circuit that uses the output of the current-to-voltage preamplifier to control the state of a visible or audible annunciator; a low battery warning circuit, a metallic outer enclosure that encompasses the electrode, current-to-voltage preamp, logic circuitry, annunciators and direct current power supply. Attached to the outer enclosure is a mounting bracket that holds the source position monitor on a radiographic camera's outer surface. When the source position monitor is attached to the camera and the direct current bias source activated, the movement of the source past the source position monitor causes the production of an electron current in the electrode. Thios current is promptly converted into a voltage, which after conditioning, is used to control the on/off state of an annunciator.

The annunciator remains activated and cycles between its on and off states at a prescribed rate as long as the source is out of its biological shield. When the source is returned to the shield the annunciator is totally disabled until the source is again placed in used.

BEST MODE FOR CARRYING OUT THE INVENTION

Referring to the drawings, wherein like numerals designate like components, a source position monitor for actively indicating the position of a sealed radioisotopic source is described.

Beginning with FIG. 1, the photon sensing component of the monitor constructed in accordance with the various features of the present invention is illustrated generally at 2. In FIG. 1, electrode assembly 2, consists of tantalum rectangular prism 4, which is electrically isolated from aluminum enclosure 6 by Teflon pieces 8. Teflon is a trademarked material of the Dupont Corporation. The Teflon pieces cover the LASPPD front side 3, backside 5 and all lateral surfaces of tantalum prism 4. The surfaces of the Teflon rectangular pieces are held in firm contact with the surfaces of the tantalum with conductive silver epoxy 10. The silver epoxy 10 provide total surface-to-surface contact between the Teflon 8 and tantalum 4 by substanially filling all surface imperfections of the two materials. The flow of electrical imperfections of the two materials. The flow of electrical charge between the Teflon pieces 8 and tantalum 4 is enhanced by the use of the silver epoxy 10. The outer surfaces of the Teflon 8 pieces are coated with silver epoxy 10. This assembly is slidably inserted into a thin walled aluminum enclosure 6 with mechanical interference between the inner surface of the aluminum enclosure 6 and the outer surfaces of Teflon 8 pieces. Teflon 8 prevents electrons liberated in Compton, photoelectric and starts P5 pair production interactions of high energy photons impinging upon the outer surface of aluminum enclosure 6 from reaching the tantalum 4. That is, the thickness of the Teflon pieces is at least twice the range of the most energetic electrons liberated in photon interactions in the aluminum enclosure 6. The photons incident on the electrode interact with the outer surface of the aluminum enclosure 6 or with the dielectric (Teflon 8) or proceeds into the tantalum 4 where they may interact via one of the aforementioned processes. Since the linear absorption coefficient of tantalum 4 is greater than that of Teflon 8, there is a greater probability of producing electrons (primarily Compton electrons) that flow into the Teflon 8 pieces. These electrons produce a polarization current that flows into the external circuitry shown in FIG. 4. The measurement of this current provides a measure of the dose rate. The rectangular prism 4 of this invention is made of tantalum, however, it could just as well have been any of a number of high electron density materials such as lead.

Figure 2:
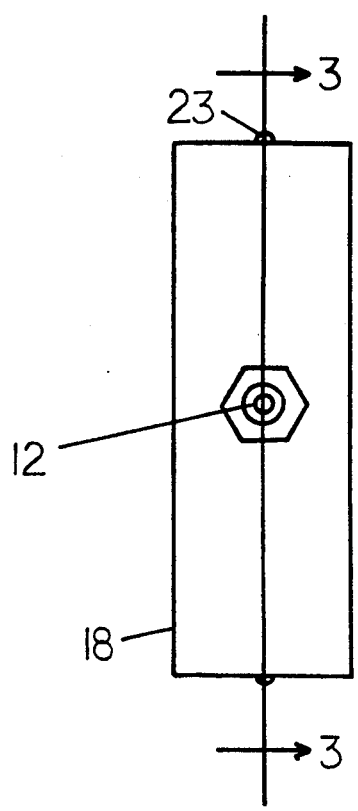
FIG. 2 is a top view of the LASPPD.
Figure 3:
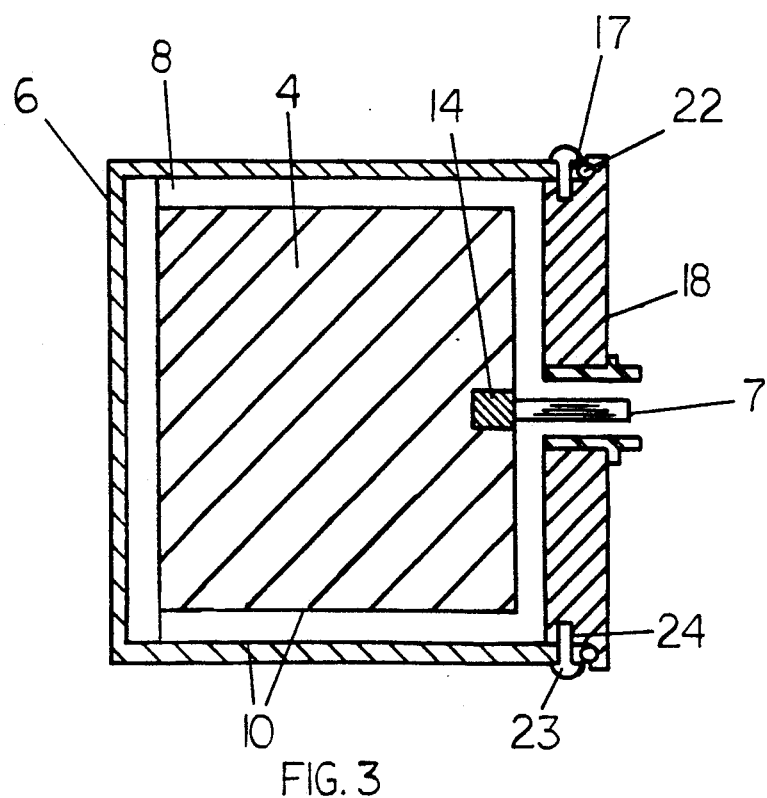
FIG. 3 shows a sectional drawing of the LASPPD taken along line A—A.
Figure 4:
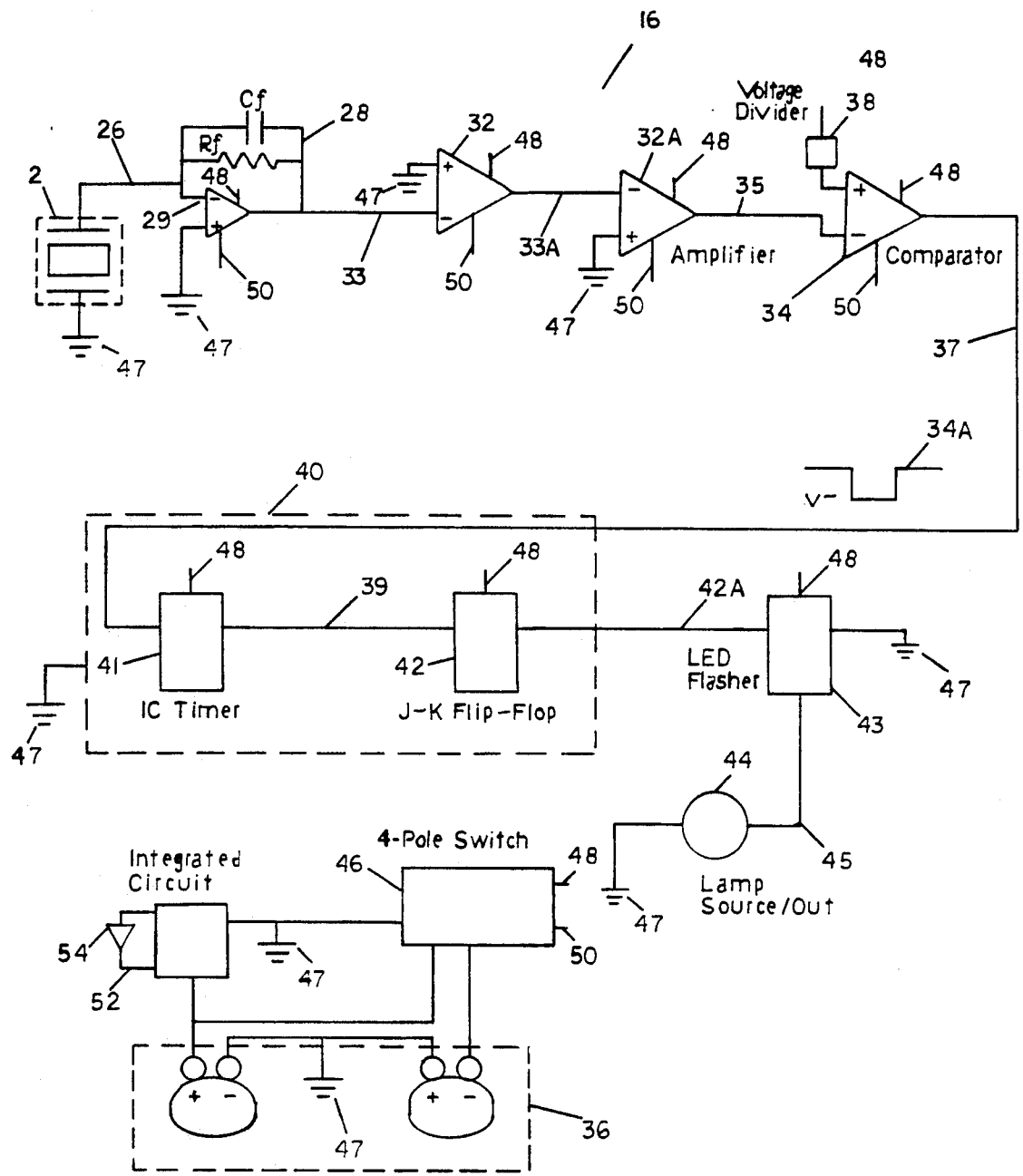
FIG. 4 shows a schematic drawing of the signal conditioning electronics, analog logic circuitry, alarm control module and visible annunciator.
Figure 5:
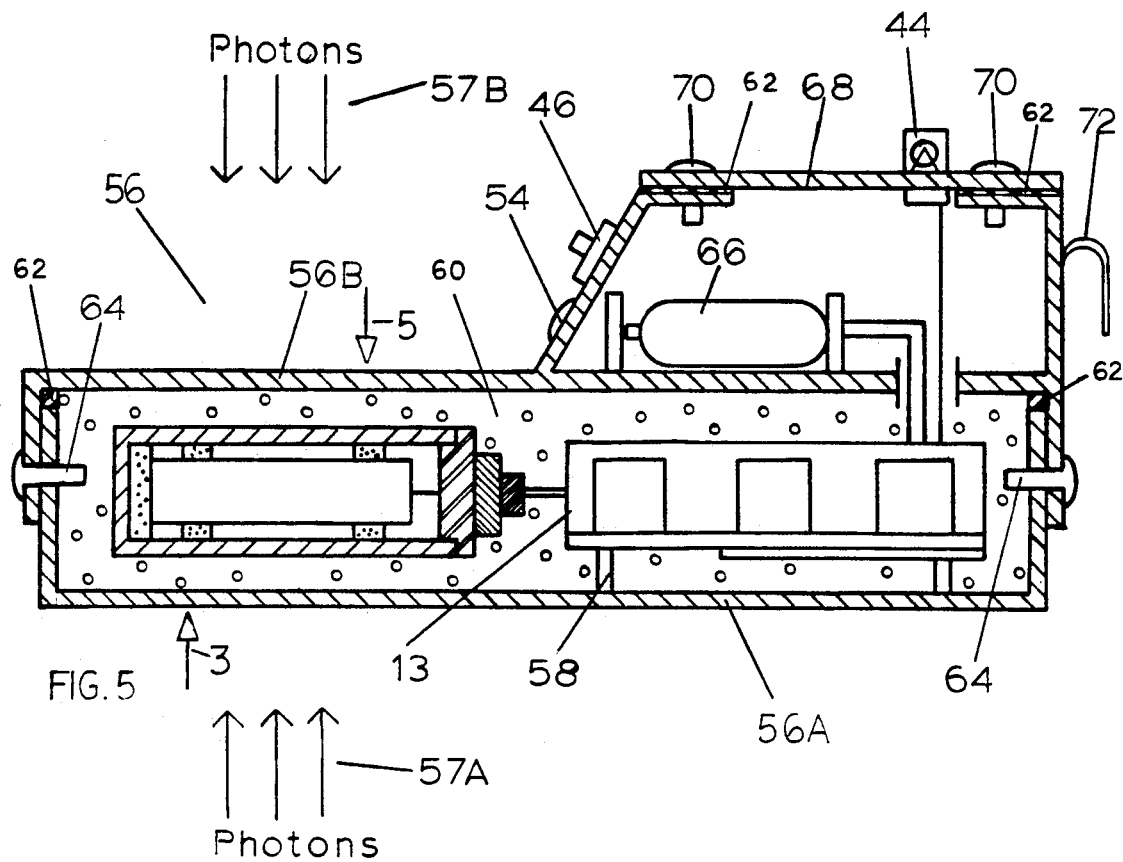
FIG. 5 is a cross sectional drawing of the source position monitor.

Connector 12, which connected to tantalum prism 4 by gold plated pin 7 via threaded brass rod 14, provides an electrical path for the flow of current between the aluminum enclosure 6 and the tantalum prism 4 via the signal conditioning electronics 16 shown schematically in FIG. 4. The connector 12, shown in FIG. 2, is designed to be thread mounted into capping lid 18 via threaded hole 20. O-ring 22, which is mounted between capping lid 18 and aluminum enclosure 6 provides hermetic sealing capability for the electrode assembly shown generally at 2 (see FIG. 1). In this invention, the enclosure 6 was made of aluminum. The use of aluminum was adopted primarily because it is lightweight and provides a conductive path for the flow of charge in the electrode assembly. The enclosure could have been made of other conductive materials or a plastic enclosure with conductive plating on its inner or outer surface. The 1/16 inch diameter O-ring ring 22 is designed to make sealing contact with the edge of the open end 17 of aluminum enclosure 6 and capping lid 18. The capping lid 18 is held in firm mechanical contact with O-ring 22, which, in term, is held under compressive load in contact with the edge 17 of the open end of aluminum enclosure 6. The capping lid 18 is held in place through the use of metal screws 23 that are screwed into threaded openings 24 of capping lid 18 in FIG. 3. The assembly of the electrode is accomplished in an inert gas atmosphere to prevent moisture from being sealed in the interior of the electrode assembly. By cleaning all components and assembling the LASPPD in an inert atmosphere, the measurable leakage current between the tantalum prism 4 and the aluminum enclosure 6 was maintained below 10 picoamperes. The current generated in the electrode assembly is conveyed out of the electrode assembly via coaxial cable 26 that is connected to connector 12 via connector 13. The central conductor 15 of coaxial cable 26 makes electrical contact with gold plated hollow pin 7 by mechanical insertion therein the coaxial cable 26 is electrically connected to the input of ordinary current-to-voltage preamplifier 28 (see FIG. 4) by coaxial cable 26 where central conductor 15 is connected to the non-inverting input of operational amplifier 29 of preamplifier 28. The voltage output of preamplifier 28 is fed to inverting amplifier 32 by electrical lead 33 where it is inverted and fed via lead 33A to amplifier 32A. The output of amplifier 32A is connected to the negative input of comparator 34 by lead 35. The positive input of comparator 34 is connected to 6 volt direct current batteries 36 via common voltage divider 38. Common voltage divider 38 provides a reference voltage at the positive input of comparator 34. When the amplitude of the voltage at the negative input of comparator 34 exceeds the amplitude of the reference voltage at the positive input, a negative pulse 34A of finite duration is generated at its output. The negative pulse is fed by electrical leads 37 to source out/in logic unit 40. Logic unit 40 consists of an integrated circuit timer 41 and a J-K flip flop 42, which are connected via electrical lead 39. The source out/in logic unit 40, which is electrically connected to incandescent lamp flasher 43 via electrical lead 42A, controls the on/off state of commercially available LED flasher 43. LED flasher 43 drives incandescent lamp 44 which is connected thereto via electrical leads 45. Amplifiers 32 and 32A, current-to-voltage preamplifier 28 logic unit 40 and LED flashers 43 along with current-to-voltage preamplifier 28 a re powered by d.c. batteries 36. Bias voltage is applied to the signal conditioning electronics through four pole switch 46 via leads 48 and 50. The status of the battery connected to IC lamp flasher 43 is monitored by a commercially available integrated circuit 52. Integrated circuit 52 provides an output voltage to power LED 54 whenever the battery voltages drops below 5 volts. The detector assembly 2, the direct current power supply 36, lamp 44 and all signal conditioning electronics and logic circuit components are connected to electrical ground 47. In FIG. 5, the electronic signal conditioning electronics are mounted into the first half of aluminum enclosure 56A using ceramic mounting studs 58, which are attached to the bottom of the first half of aluminum enclosure 56A. The signal conditioning electronics and electrode assembly are held firmly in aluminum enclosure 56 with clear potting compound 60 that protects the electronics and electrode assembly from moisture and mechanical shock. The second half of aluminum enclosure 56B complete with rubber gasket 62 is attached to the first half of aluminum enclosure 56 by 10-32 metal screws 64. The second half of aluminum enclosure 56 contains battery compartment 66. Aluminum plate 68 is used to close battery compartment 66 and is held in place by 4-40 metal screws 70. Gasket material 62 provides a water and moisture proof seal for the battery compartment. The aluminum enclosure 56 is designed to be mounted on a radiographic camera using an ordinary flexible strap onto which clip 72 slides with spring force resistance. In FIG. 1 and FIG. 5, the Teflon prism on the front side and backside 5 are of equal thicknesses, however, they could be of unequal thicknesses. Further, LASPPD could consist of aluminum enclosure 6 wherein tantalum prism 4 has a solid dielectric on backside 5 and a gaseous dielectric on its front side 3 of equal thicknesses. This LASPPD would be highly sensitive to the hemispherical origin of the incident photons. That is, when unequal thicknesses of Teflon are used, the detector assembly 2 has directional sensitivity. The output current of the detector with unequal thickness of Teflon when equal photon fluxes are incident upon the detector from directions 57A and 57B, could vary as much as a factor of two when a first thick Teflon prism is positioned on the front side 3 and a thin Teflon prism is placed on the backside 5 and the detector is placed in an isotropic photon field.

The first embodiment of the device of this invention is discussed herein with an electrode assembly wherein the central electrode, tantalum prism 4, is surrounded on all surfaces with Teflon that insulated it from the thin walled aluminum enclosure 6.

Figure 6:
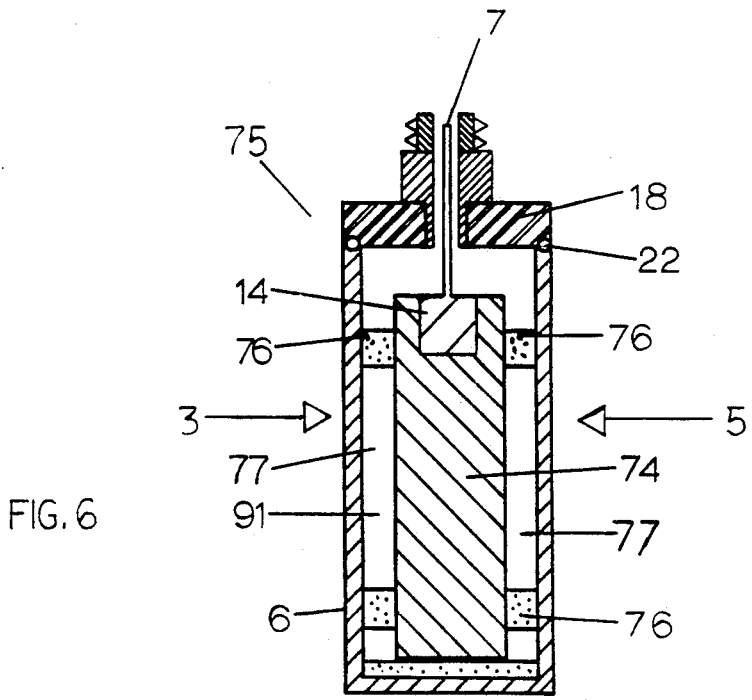
FIG. 6 is a schematic drawing of the large area self-powered photon detector with a gaseous dielectric that is used in a second embodiment of the source position monitor.
Figure 7:
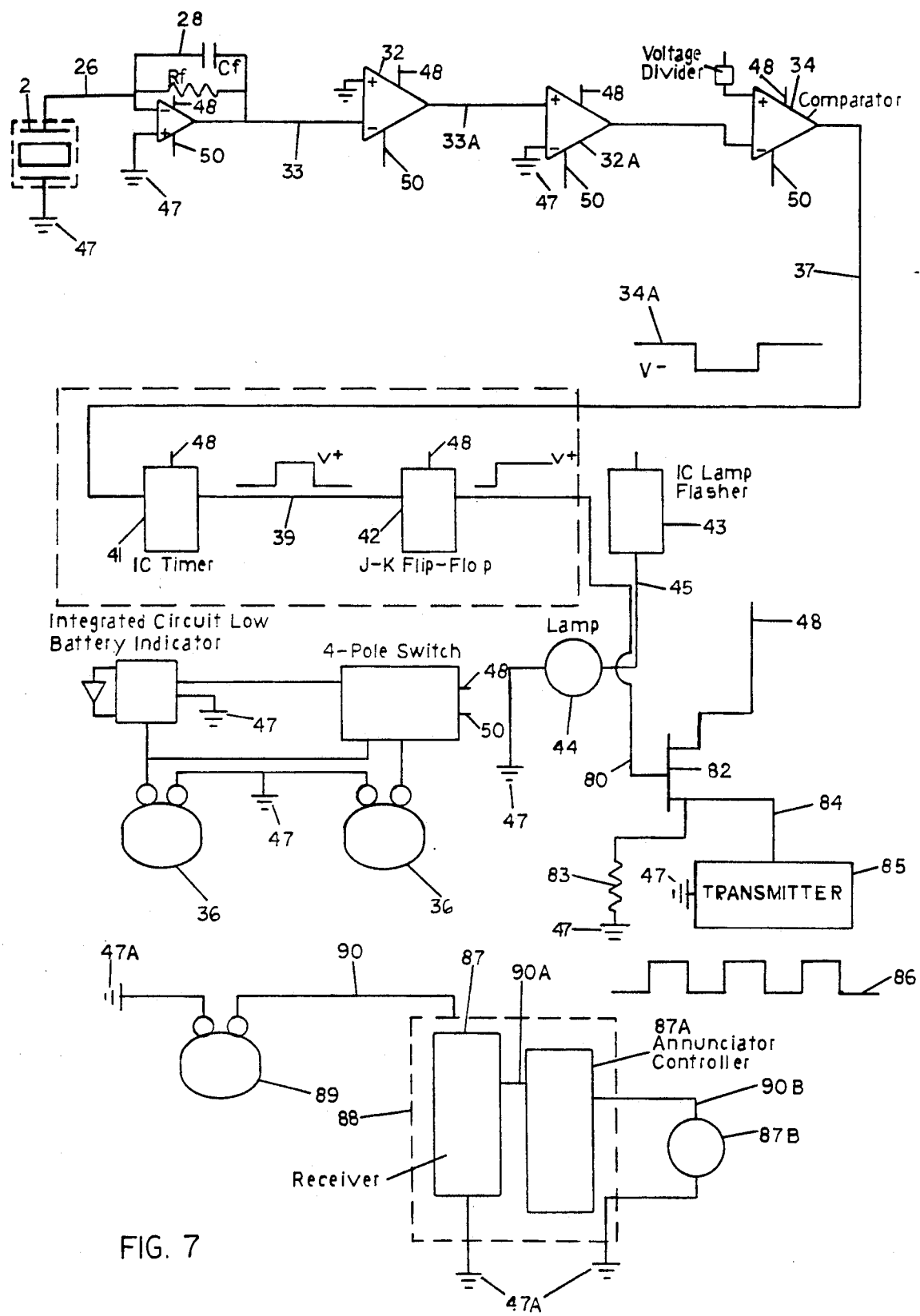
FIG. 7 is a schematic drawing of the signal conditioning electronics, analog logic circuitry, alarm control module, transmitter, receiver and alarm module of the second embodiment of the source position monitor.

The LASPPD of the second embodiment of this invention is shown in FIG. 6, is composed of a high atomic metallic material 74 supported on all of its lateral faces by Teflon standoffs 76 with the volume between the metallic material 74 and outer aluminum enclosure 6 that is substantially filled with a gaseous dielectric 77 as shown schematically in FIG. 6. The LASPPD of FIG. 6 provides isotropic response to incident photons. The LASPPD of FIG. 6 is made directionally sensitive when all except the lateral face 91 of the detector is covered with a solid dielectric that fills the volumes between all surfaces of prism 4, with the exception of face 91, and the inner surfaces of enclosure 6. The currents in the metallic material 74 generated by incident photons include the Compton current flowing onto the metallic material 74 and a current induced in the central electrode due to the build up of space charge in the gaseous dielectric 77 surrounding the central metallic material 74. The space charge induced currents vanishes immediately after the beam of radiation is applied to the LASPPD 75 when it is connected to and an external circuit. The output charge of LASPPD 75 is connected, as in the case of LASPPD 2, to current-to-voltage preamplifier 28 of FIG. 7 which is in turn connected to inverter amplifier 32. The output of inverter amplifier 32 is fed to amplifier 32A whose output analog signal is electrically coupled to the negative input of comparator 34. When the LASPPD 75 is exposed to a transient gamma field produced enpassant by a moving source, a transient current is generated that is converted into a voltage pulse by preamplifier 28 that is inverted by inverter amplifier 32 and further amplified by amplifier 32A. The voltage pulse output of 32A is inputted to comparator 34 which has at all times a positive reference voltage applied to its positive input. If the voltage pulse inputted to the negative input of comparator 34 exceeds the magnitude of the applied reference voltage, the comparator 34 output voltage switches from a high to a low value and remains low until the input to its negative input becomes less than that of the reference voltage. The initial negative going portion of the comparator's output trigger J-K flip-flop 42 such that its output goes high where it remains until the LASPPD 75 is exposed to a second transient gamma field as by the source returning to the radiographic camera. The J-K flip-flop 42, which is electrically connected to the gate of transistor 82 via electrical lead 80 controls the conductive state of the transistor 82. When a voltage is applied to the gate of transistor 82 by way of lead 80, transistor 82 is placed in a conductive state and a voltage is developed across resistor 83 such that it allows a path via electrical lead 84, for a bias voltage to be applied to commercially available radio frequency transmitter 85 by providing a conductive path between d.c. batteries 36 and the bias inputs of transmitter 85. When activated, transmitter 85 transmits logic signal 86 to ordinary radio frequency receiver 87 in remote module 88, which may be worn by a radiographic technician. The logic signal 86, when received by remote receiver 87 results in the activation of the annunciator controller 87A. When the annunciator becomes active, it remains active until the source is returned to the interior of the radiographic camera. The receiver 87 and annunciator controller 87A are electrically connected by electrical leads 90A. The annunciator 87B is a lamp. The annunciator 87B, which is controlled annunciator 87A, could be an audible alarm. The remote module 88, consisting of receiver 87, annunciator controller 87A and annunciator 87B is powered by direct current supply 89 in which connected thereto by electrical lead 90. The remote module 88 which along with direct supply 89, may be housed in ordinary plastic containers that may be worn by a radiographic technologist or placed in a position where its visible annunciator or audible alarms are unobstructed or attenuated. The power supply 89 and remote module 88 are connected to common ground 47A. From the foregoing, it will be apparent to a person skilled in the art, that a self-powered photon detector base source position monitor for use on radiographic cameras to provide radiographers with active indication of the position of the sealed photon of these units has been developed. Although only a limited number of specific embodiments have been described in detail, such description is not to be taken as a limitation of the present invention. Rather, the scope of the invention is to be defined by the appended claims and their equivalents.

I claim:

1. An apparatus for monitoring the position of sealed photon sources of radiographic units during their use in nondestructive inspection of industrial components comprises:

self powered photon detection means;

signal conditioning means connected to said photon detection means for conversion of the charge output of the photon detection means into a voltage;

analog logic means electrically connected to said signal conditioning means designed to provide a temporal voltage signal when a radiographic source is moved into and out of a radiographic camera;

integrated circuit means connected to said analog logic means for providing an oscillatory voltage at its output that is used to power a source/out alarm annunciator;

direct current power supply means for electrically energizing the signal conditioning means, said analog logic means, said integrated circuit means, and said source/out alarm annunciator;

an enclosure for housing the photon detection means, signal conditioning means, analog logic means, integrated circuit means, said direct current power supply means and the source/out alarm annunciator;

and, mechanical means connected to said enclosure for mounting the enclosure onto a radiographic camera.

2. The device of claim 1, wherein said photon detection means consist of a detector assembly containing a central electrode and an outer electrode whose physical separation is maintained by a dielectric whose first and second surfaces are held in firm contact with the inner and outer surfaces of the outer electrode and central electrode, respectively, with a conductive adhesive.

3. The device of claim 1 wherein said photon detection means consists of a rectangular shaped outer electrode spaced from and disposed about a central electrode prism with the volume between them substantially filled with a gaseous dielectric.

4. The device of claim 1 wherein the annunciator consists of an incandescent lamp.

5. A monitor of the position of a sealed radiation source during the radiographic inspection of components comprises:

a self-powered photon detector;

current-to-voltage converter means electrically connected to said self-powered detector for converting the output current of the self-powered detector to a voltage;

amplification means and analog logic means electrically connected to the output of said current-to-voltage converter means for providing an output pulse when a gamma source is proximate the self-powered detector;

transistor switching means electrically connected to the output of said analog logic means which controls the electrical power applied to an integrated circuit for controlling the off/on state of an incandescent lamp and a radio frequency transmitter;

direct current power supply for electrically energizing said amplification means, the analog logic means, said integrated circuit, said radio frequency transmitter and said incandescent lamp;

pliant sealing material that seals and isolates the self-powered detector, the current-to-voltage converter means, the radio frequency transmitter, the amplification means, the analog logic means from ambient moisture and mechanical vibrations;

a radio frequency receiver enclosed in a remote module that detects the output signal of the radio frequency transmitter and activates a visible annunciator contained in said remote module;

an aluminum enclosure that encompasses the self-powered detector, the current-to-voltage converter means, the amplification means, the analog logic means, the integrated circuit, said transistor switching means and the radio frequency transmitter onto which said incandescent lamp is mounted.

6. The device in claim 5 wherein the self-powered photon detector consists of a large atomic number material central electrode sandwiched between a solid dielectric on its backside and a gaseous dielectric on its front side face with all lateral surfaces excluding the single cylindrical opening for conveying the charges generated in said central electrode out of the detector with the electrical conductor electrically connected to a connector mounted on the detector's outer enclosure surface.

* * * * *